US010281004B2

(12) United States Patent
Mupende et al.

(10) Patent No.: US 10,281,004 B2
(45) Date of Patent: May 7, 2019

(54) SWIVEL

(71) Applicant: Liebherr-Components Biberach GmbH, Biberach an der Riss (DE)

(72) Inventors: Ilaka Mupende, Neu-Ulm (DE); Horst Zerza, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 450 days.

(21) Appl. No.: 14/915,597

(22) PCT Filed: Jul. 23, 2014

(86) PCT No.: PCT/EP2014/002019
§ 371 (c)(1),
(2) Date: Feb. 29, 2016

(87) PCT Pub. No.: WO2015/028111
PCT Pub. Date: Mar. 5, 2015

(65) Prior Publication Data
US 2016/0223052 A1    Aug. 4, 2016

(30) Foreign Application Priority Data

Aug. 28, 2013  (DE) .................. 10 2013 014 341
Oct. 18, 2013  (DE) .................. 10 2013 017 431

(51) Int. Cl.
*F16G 11/09*    (2006.01)
*F16G 15/08*    (2006.01)
(Continued)

(52) U.S. Cl.
CPC ............ *F16G 11/00* (2013.01); *B66C 15/00* (2013.01); *B66C 23/62* (2013.01); *B66C 23/88* (2013.01); *B66D 1/485* (2013.01)

(58) Field of Classification Search
CPC .......... F16G 11/08; F16G 11/09; F16G 15/08; B66C 13/04; B66C 13/08
See application file for complete search history.

(56) References Cited

U.S. PATENT DOCUMENTS 2,353,479 A    7/1944  Lock
5,114,025 A    5/1992  Verreet
(Continued)

FOREIGN PATENT DOCUMENTS

CN    202326907 U    7/2012
DE     3937631 A1    5/1991
(Continued)

OTHER PUBLICATIONS

ISA European Patent Office, International Search Report Issued in Application No. PCT/EP2014/002019, dated Oct. 13, 2014, WIPO, 5 pages.
(Continued)

*Primary Examiner* — Michael P Ferguson
(74) *Attorney, Agent, or Firm* — McCoy Russell LLP

(57) ABSTRACT

The present invention relates to a swivel for the reduction of twist of a rope, having two swivel parts which are rotatable with respect to one another in the longitudinal direction of the rope, wherein a rotary drive is provided for the forced rotation of the two parts with respect to one another. In accordance with the invention, at least one direction of rotation measurement unit is provided at the swivel for the detection of the direction of twist of the rope with respect to the swivel, wherein the rotary drive can be controlled by a control apparatus in dependence on the determined direction of twist such that the swivel part connected to the rope is rotated in the direction of the detected direction of twist.

14 Claims, 3 Drawing Sheets

(51) Int. Cl.
  *F16G 11/00*    (2006.01)
  *B66C 15/00*    (2006.01)
  *B66C 23/62*    (2006.01)
  *B66C 23/88*    (2006.01)
  *B66D 1/48*     (2006.01)

(56) References Cited

U.S. PATENT DOCUMENTS

| | | |
|---|---|---|
| 2006/0012855 A1 | 1/2006 | Wolleschensky |
| 2011/0011818 A1 | 1/2011 | Corcoran |
| 2012/0080895 A1* | 4/2012 | Aoki ................ B66C 13/08 294/82.15 |

FOREIGN PATENT DOCUMENTS

| | | |
|---|---|---|
| DE | 202005009235 U1 | 9/2006 |
| JP | S60164149 U | 10/1985 |
| WO | 2010150336 A1 | 12/2010 |

OTHER PUBLICATIONS

Japan Patent Office, Office Action Issued in Patent Application No. 2016-537150, dated Mar. 6, 2018, 6 pages. (Submitted with Partial Translation).

State Intellectual Property Office of the People's Republic of China, Office Action and Search Report Issued in Application No. 201480059102.9, dated Feb. 4, 2017, 14 pages. (Submitted with Partial Translation).

\* cited by examiner

View A-B

SWIVEL

CROSS REFERENCE TO RELATED APPLICATIONS

The present application is a U.S. National Phase of International Patent Application Serial No. PCT/EP2014/002019, entitled "Swivel," filed on Jul. 23, 2014, which claims priority to German Patent Application No. 10 2013 017 431.7, filed on Oct. 18, 2013, and to German Patent Application No. 10 2013 014 341.1, filed Aug. 28, 2013, the entire contents of each of which are hereby incorporated by reference in their entirety for all purposes.

TECHNICAL FIELD

The present invention relates to a swivel for the reduction of twisting of a rope, having two swivel parts which are rotatable with respect to one another in the longitudinal direction of the rope, wherein a rotary drive is provided for the forced rotation of the two parts with respect to one another.

BACKGROUND AND SUMMARY

Rope drives, for example of cranes or other hoisting devices such as elevators, in which a rope subject to tensile force is wound up onto a hoisting drum and/or is deflected about rope pulleys tend to twist the rope, in particular when the latter is braided or laid from wires. The twist of the rope in this respect is inter alia created due to the multilayer winding on the hoisting drum and due to torque differences between the different wire layers. Rope pulleys which are not in exact alignment with the longitudinal rope direction can also induce twist. The rope then tends to rotate in itself, i.e. to rotate about its longitudinal axis, which can, on the one hand, result in increased wear at the rope itself, but, on the other hand, can also result in a rotation of the lifting hook with rope pulleys and corresponding safety risks due to increased rope wear; with hoisting devices such as cranes, the problem additionally arises that the lifting hook twists and the rope strands cable and then cross and no longer easily untwist, which does not allow any further operation due to increased wear.

To avoid such rope torsion, it is known to install so-called swivels into the rope drive. Such a swivel as a rule designates a connection of two parts which can be subjected to tension, wherein one part can rotate with respect to the other in the axis of the tensile direction. The two swivel parts are therefore rotatable with respect to one another in the direction of the longitudinal rope axis, in particular about an axis of rotation coaxial to said longitudinal rope axis, for example via a roller bearing connection, wherein a rotatable swivel part is rotationally fixedly connected to the rope, while the other swivel part, which is typically in a fixed position, is rotationally fixedly connected in an articulated manner with respect to a rotation about the longitudinal rope axis, for example to a boom of a crane to which the rope is attached via the named swivel. It has also already been proposed to integrate such a swivel into a rope or to connect two rope pieces to one another by such a swivel, cf. DE 20 2005 009 235 U1, in order to be more flexible with respect to the rope pieces to be untwisted. In the last-named case, there is not swivel part which is attached in a fixed position, but rather each of the swivel parts is rotationally fixedly connected to a rope piece and is itself rotatable in this respect.

Even if such swivels are easy to rotate, for example by the use of roller bearings, i.e. if a compensation rotation can take place between the two swivel parts without any larger resistance, a predefined twist power is sometimes required to introduce a compensation rotation. On the other hand, it sometimes occurs with sheeved rope progressions with large rope lengths such as are customary with tower cranes having trolleys, but also with other cranes, that the twist reduction of the rope cannot be passed on via the corresponding rope pulleys of the sheeving. To be able also to reduce even smaller twists of the rope, it has therefore already been proposed to provide such a swivel with a rotary drive with the aid of which the two swivel parts can be rotated in a forced manner relative to one another, cf. DE 39 37 631 A1. Since the twist of the rope is typically reflected in a rotation of the lifting hook with the pulleys, the crane operator can monitor the angular position of the lifting hook and can actuate the rotary drive of the swivel as soon as he recognizes a rotation of the loose lifting hook with pulley.

The recognition of a skewed angular position of the loose lifting hook is, however, not always very simple. This generally also applies to steel ropes which transmit relatively high torsional forces and if the lifting hook can rotate relatively fast. This applies to a particular degree, however, for high-strength fiber ropes composed of synthetic fibers such as aramid fibers (HMPA), aramid carbon fiber composites, high-modulus polyethylene fibers (HMPE) or poly (p-phenylene-2,6-benzobisoxazole) fibers (PBO). Such fiber ropes have a much smaller rotational stiffness than steel ropes so that rope torsion does not result to the same degree in a rotation of the loose lifting hook with pulleys and is in this respect more difficult to recognize. Like a steel rope, however, such a fiber rope is also rotated in the rope drive, which results in more rope damage such as rope buckling, which in particular forms toward the rope end.

Starting from this, it is the underlying object of the present invention to provide an improved swivel of the named type which avoids disadvantages of the prior art and further develops the latter in an advantageous manner. A smaller twist formation should also in particular be remedied faster and twist at ropes having smaller rotational stiffness should be combated better.

It is therefore proposed no longer only to actuate the rotary drive of the swivel on a rotation of the loose rope pulley in the lifting hook, but rather to detect any rope twist directly at the swivel and to set the rotary drive into operation as soon as twist forces or twist torques from the rope act on the swivel or as soon as these twist forces or twist torques reach a specific level. For this purpose, a sensor unit is provided at the swivel which detects effects of the rope twist on the swivel so that the forced rotation of the swivel parts can be controlled very much more precisely. In accordance with the invention, at least one direction of rotation measurement unit is provided at the swivel for the detection of the direction of twist of the rope with respect to the swivel, wherein the rotary drive can be controlled by a control apparatus in dependence on the determined direction of twist such that the swivel part connected to the rope is rotated in the direction of the detected direction of twist. The rope twist is reduced, and optionally almost completely eliminated by such a subsequent rotation of the rotatable swivel part in accordance with the detected direction of rope twist so that the swivel part follows the rope twist. Even smaller rope rotations can be reduced or also ropes with less rotational stiffness such as fiber ropes can be kept largely free of twist by the twist detection at the swivel itself so that a much higher service life can be achieved due to smaller wear.

In an advantageous further development of the invention, the sensor unit provided at the swivel cannot only comprise a direction of rotation sensor, but also a torque gauge for determining the torque induced by the rope twist at the swivel. Such a quantitative determination of the rope twist or its effects on the swivel by amount allows an even more precise control of the rotary drive than is possible using a twist determination only by sign. The angle of rotation to be carried out by the rotary drive or the speed to be carried out can be adapted by magnitude to the level of the detected twist torque, preferably such that the swivel is immediately further rotated a larger amount when a larger twist or a larger torque is detected, whereas only a smaller rotational movement is carried out when a smaller torque is detected. The dependency between magnitude of the torque and the amount of the angle of rotation is, however, not compulsory and can, if it is provided, be adapted to the respective rope used, for example such that the rotational stiffness of the respective rope used is taken into account. If, for example, a steel rope having a high rotational stiffness is used, a smaller rotational movement of the swivel can also be sufficient with higher torques induced at the swivel to eliminate the rope twist. If, however, a high-strength fiber rope is used which has a relatively low rotational stiffness, a larger rotational movement of the swivel can be initiated—in comparison with the steel rope—with a corresponding torque which is detected at the swivel.

The determination of the direction of rotation and/or of the magnitude of the rope twist can generally take place at different points at the swivel. In accordance with an advantageous embodiment of the invention, the direction of rotation measurement unit and/or the torque gauge can be formed between one of the two swivel parts and the rotary drive to detect a bearing reaction on the rope twist at the rotary drive bearing, in particular a rotation of the rotary drive induced by the rope twist with respect to the named swivel part or the inclination thereto with respect to direction and optionally magnitude. The direction of rotation measurement unit and/or the torque gauge can in particular be associated with a torque support, by means of which a rotation of the rotary drive is intercepted with respect to an abutment contour at the named swivel part. If the swivel is rotationally fixedly mounted, for example to attach a crane hoisting rope to a crane boom, the direction of rotation measurement unit and/or the torque sensor can be provided between a rotary drive housing part and an abutment contour at the fixed-position swivel part.

Alternatively or additionally, the direction of rotation measurement unit and/or the torque gauge can also have a sensor element between a connection piece, which is used to connect the rope at the rotatable swivel part, and the named rotatable swivel part. Further alternatively or additionally, such a sensor element can also be integrated in the drive train of the rotary drive, for example between two transmission elements of an interposed transmission.

If the rotary drive is supported against rotation at a swivel part by means of a torque support in the aforesaid manner, in a further development of the invention, the at least one torque support of the rotary drive—or optionally also a plurality of torque supports—can be associated with at least two abutment contours which are fixedly connected to the swivel part to secure or support the torque support and thus the rotary drive in both, i.e. opposite, possible directions of rotation. In this respect, the two abutment contours can advantageously be arranged relative to the at least one torque support such that the rotary drive has rotary clearance with respect to the swivel part, that is can be rotated a small amount onward with respect to the swivel.

In an advantageous further development of the invention, a sensor element can be associated with each of the abutment parts or with each abutment contour to detect the direction of rotation and/or the torque quantitatively when the torque support contacts a respective abutment part. If the torque support contacts the one abutment part, this signals a first direction of rotation of the rope twist, whereas a contact of the torque support at the other abutment contour indicates the opposite direction of rotation. The contact pressure of the torque support against the abutment contour can in this respect be considered as a measure for the magnitude of the induced torque.

To be able to detect the direction of rotation of the swivel and optionally also its magnitude in the sense of a torque amount in a simple manner between the swivel part and the rotary drive housing, it is advantageous for the rotary drive not to be configured as self-locking or for it to be able to be blocked or at least braked so much by a braking device that the torque induced by the rope twist can be converted into a rotation of the drive housing. A braking device can have a preloaded friction brake, for example in the form of a multi-disk brake, which is vented on the putting into operation of the rotary drive.

If the rotary drive is supported at least within limits with respect to the swivel part in the aforesaid manner, for example by means of a torque support between two abutment parts whose spacing exceeds the thickness of the torque support, in a further development of the invention, a braking apparatus can be provided between the swivel part and the rotatably supported drive housing part for braking the rotation of the drive housing with respect to the swivel part and/or an elastic restoring apparatus can be provided for applying a restoring force which attempts to hold back the drive housing with respect to the swivel part in a starting position which can then, however, be overcome by the rope twist. An unstable, hypersensitive or even uncontrolled rotation to and fro of the rotary drive with respect to the swivel part, in particular with respect stationary swivel part is avoided by such a braking apparatus and/or retention apparatus, which would result in an unwanted signal flicker of the direction of rotation measurement unit and/or of the torque gauge.

The named braking apparatus and/or restoring apparatus can, for example, comprise a spring device which attempts to bring the torque support or another rotationally effective support part of the rotary drive into a predefined position.

The invention will be explained in more detail in the following with respect to a preferred embodiment and to associated drawings.

DETAILED DESCRIPTION

Figure 1:
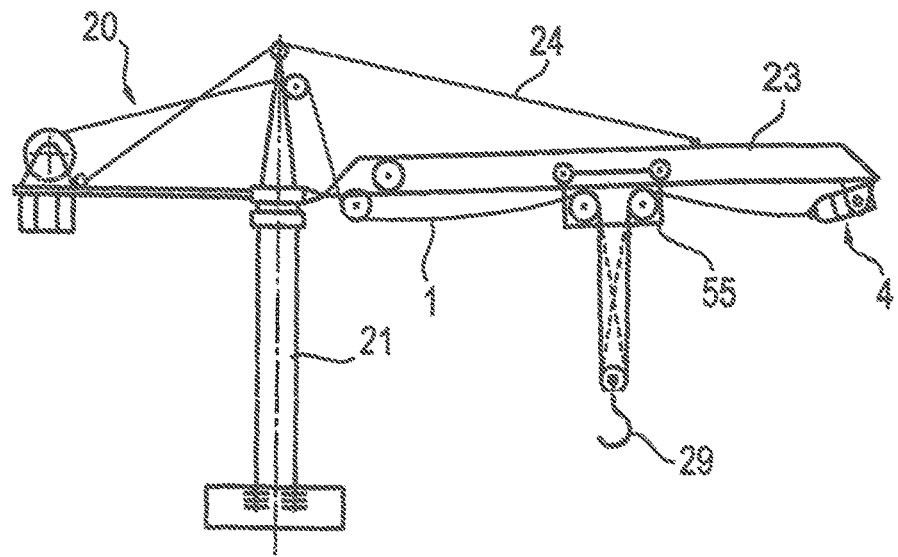
FIG. 1 shows a schematic representation of a hoisting device in accordance with the invention in the form of a tower crane in accordance with an advantageous embodiment of the invention, whose hoist rope and/or whose guying ropes can be configured as fiber ropes for the luffable boom, wherein a swivel fastens the end of a hoist rope running off from a hoisting drum and guided over a trolley at the boom of the crane.

FIG. 1 shows by way of example for a hoisting device in accordance with an advantageous embodiment of the invention a crane in the form of a tower crane 20 which revolves at the tip and whose tower 21 is supported on a carriage or on a stationary base. A boom 23 is connected in an articulated manner to the tower 21 in a manner known per se and is guyed via a guying 24. The named guying 24 can be configured as rigid, for example in the form of stay poles, but also as adjustable in the form of a guying distribution which can be varied in length via a guying rope winch 25 so that the adjustment angle of the boom 23 can be varied, as FIG. 2 shows.

As FIG. 1 shows, the tower crane 20 can in this respect be provided with a trolley boom. A trolley 55 is movably supported at the aforesaid boom 23 which lies in the operating position and is in particular oriented horizontally, wherein the named trolley 55 can be moved by means of a trolley rope, for example, which can be guided at the boom tip via pulley blocks.

Figure 2:
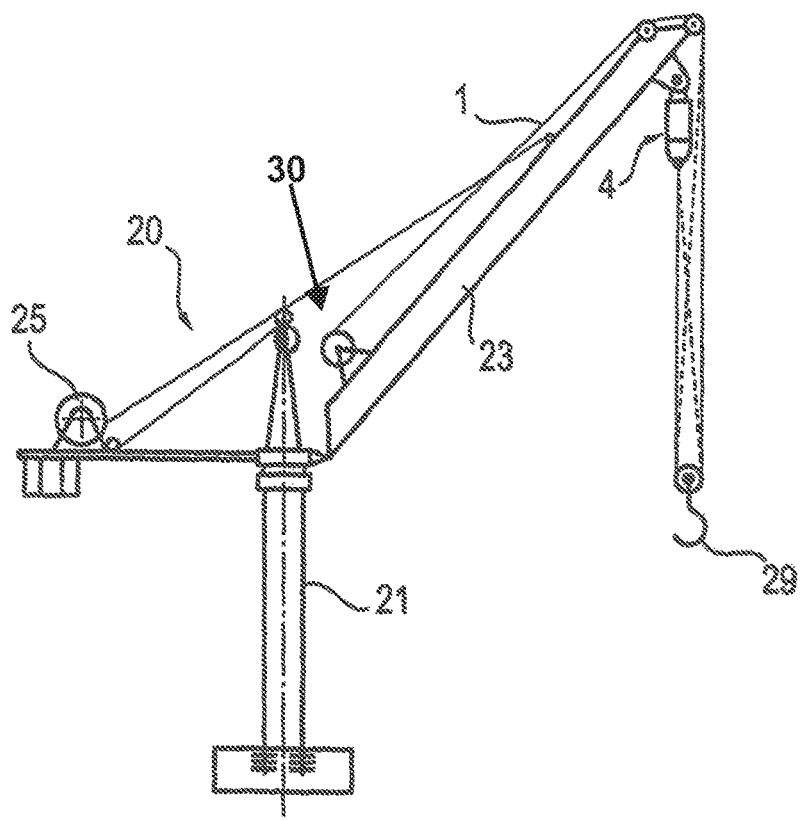
FIG. 2 shows a schematic representation of a hoisting device in accordance with the invention in the form of a tower crane in accordance with a further advantageous embodiment of the invention whose boom is luffable, wherein the hoist rope running off from a hoisting drum runs off over the boom tip and a swivel fastens the rope end at the boom end.

The tower crane furthermore comprises a hoist rope 1 which can be let down from the tip of the boom via pulley blocks at the boom tip and is there connected to a crane hook 29, as FIG. 2 shows or in the embodiment in accordance with FIG. 1, can run off via the said movable trolley 55 and pulley blocks provided there and can be connected to the crane hook 29. The named hoist rope 1 in both cases runs onto a hoist winch 30.

The named hoist rope 1 and/or the guy rope can in this respect be configured as a fiber rope which can comprise synthetic fibers such as aramid fibers or an aramid/carbon fiber composite.

In both cases, the named hoist rope 1 and/or the guy rope can be attached by means of a swivel 4 to the boom 23 of the crane or optionally to another structural crane part.

Figure 3:
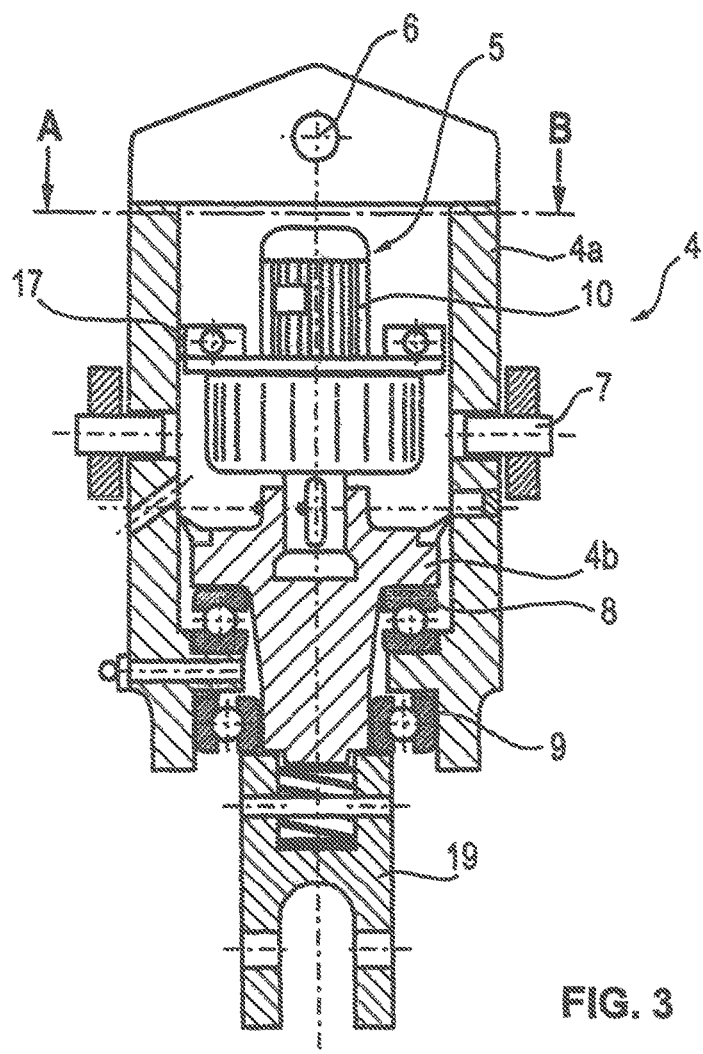
FIG. 3 shows a schematic representation of the swivel integrated in the rope drive of the hoist rope of the crane of FIG. 1 in a longitudinal section which shows the rotary drive of the swivel.
Figure 4:
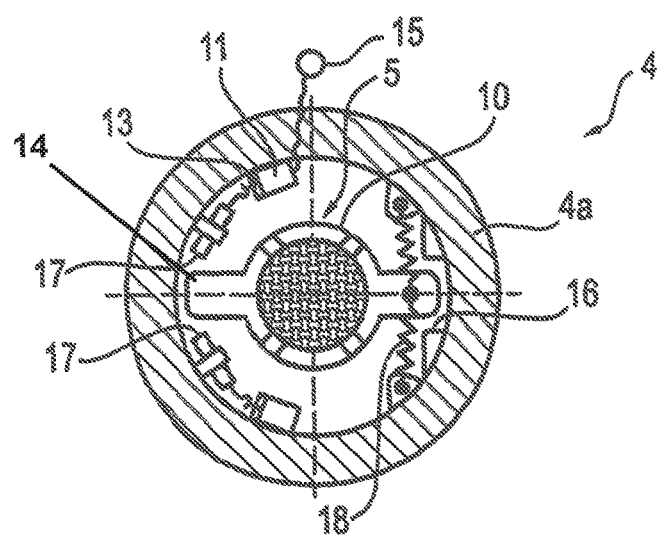
FIG. 4 shows a cross-section through the rotary drive of the swivel of FIG. 3 along the line A-B, wherein the torque support and the torque gauge facing the rotary drive are shown.

As FIGS. 3 and 4 show, the named swivel 4 comprises two swivel parts 4a and 4b which are rotatable relative to one another in the longitudinal rope direction. The swivel part 4a in this respect forms a fixed-position or rotationally fixed swivel part which is rotationally fixedly supported at the boom 23 with respect to the longitudinal rope direction. In this respect, an oscillating, suspended or upright arrangement can be provided via a first bearing axle 6 or a lying, likewise oscillating arrangement can be provided via the second bearing axle 7 which allow the oscillating movements or pivoting movements transverse to the longitudinal rope direction, but suppress a rotation of the swivel part 4a in the longitudinal rope direction.

The other swivel part 4b forms the rotatable swivel part to which the rope 1 is rotationally fixedly fastened. The named rotatable swivel part 4b can be rotatably supported about the longitudinal rope direction, for example via roller bearing, for example in the form of an axial bearing 8 and of a radial bearing 9 at the fixed-position swivel part 4a.

The rotatable swivel part 4b can advantageously be connected to a rotary drive 5 which can advantageously be accommodated in the interior of the swivel 4. The fixed-position swivel part 4a can for this purpose be configured as bell-shaped or sleeve-shaped, for example, to provide a reception space for the rotary drive 5. A converse configuration with a bell-shaped or sleeve-shaped contour of the rotatable swivel part 4b, which could then surround the fixed-position swivel part 4a, can, however, likewise be provided.

The named rotary drive 5 can, for example, comprise an electric motor which is optionally rotationally fixedly connected to the rotatable swivel part 4b via a transmission or also directly to an output shaft. A drive housing 10 of the rotary drive 5 can be secured against rotation at the fixed-position swivel part 4a, for example by means of one or more torque supports 14 which can be supported at the swivel part 4a via abutments or via other suitable bearing contours, cf. FIG. 4.

As FIGS. 3 and 4 show, the swivel 4 is metrologically equipped beyond the named rotary drive 5 in order to detect the angle of rotation of the two swivel parts 4a and 4b on a relative rotation with respect to one another and to detect the torque required for a rotation of the two swivel parts 4a and 4b and also the respective direction of rotation.

As in particular FIG. 4 shows, the rotary drive 5, including its drive housing 10, can be rotatably received a little in the fixed-position swivel part 4a, with the rotatability being bounded or intercepted by a torque support 14 which projects outwardly from the drive housing 10 to the peripheral wall of the swivel 4a. For this purpose, abutment parts or abutment contours 16 are provided at the named swivel part 4a or at its peripheral wall; they are in the way on a rotation of the rotary drive 5 of the torque support 14 and collide therewith and thus bound the rotation. The named connection contours 16 can be integrally molded in one piece to the swivel part 4a or can be separately fastened thereto, for example in the form of blocks which are screwed or welded on.

As FIG. 4 shows, in this respect two torque supports 14 can in principle also be provided which are each arranged between a pair of such abutment contours 16. To ensure the rotatability, the spacing of two abutment contours 16 from one another is larger than the thickness of the torque support 14 received therebetween.

As in particular FIG. 4 shows, sensor elements 17 are associated with two abutment contours 16 and detect the approach and/or the contact and/or the abutment of the torque support 14 at the respective abutment contour 16. The two sensor elements 17 can in this respect work in a tactile manner, for example in the form of a spring-loaded sensing device, or also in a contactless manner in accordance with a suitable measurement principle. The two sensor elements 17 in this respect together form a direction of rotation measurement unit 13 with which the direction of rotation of the twist of the rope 1 can be determined. If the rope twist moves in the one direction, the torque support 14 is rotated toward an abutment contour, whereas, with an opposite rope twist, the torque support 14 moves toward the other abutment contour.

The signal of this direction of rotation measurement unit 13 is evaluated by the control apparatus 15 or is used to set the rotary drive 5 into motion in order, in dependence on the detected direction of rotation of the rope twist, to actuate the rotary drive in the one direction or in the other direction and to bring about a corresponding forced rotation of the swivel part 4b so that the latter is guided behind the twist of the rope 1. This tracking of the rotatable swivel part 4b can be an iterative process, in particular such that if the signal of the direction of rotation sensor is absent, the rotational movement is stopped until the rope twist again presses the torque support 14 toward the respective abutment contour 16.

The named sensor elements 17 and/or further sensor elements at the named abutment contours can in this respect also be configured such that they detect the contact pressure or surface pressure of the torque support 4 against the respective abutment contour 16, with here spring-loaded tactile sensor elements or other suitable pressure sensors being able to be used in the named manner. This contact pressure is a measure for the magnitude of the torque which is induced by the rope twist and is thus a measure for the rope twist itself In the previously described manner, the control apparatus 15 can take account of the magnitude of the rope twist by varying the magnitude of that the adjustment path, i.e. the angle of rotation which is produced by the actuation of the rotary drive 5 or by adapting it to the magnitude of the torque, in particular to the extent that with a larger induced torque a larger angle of rotation is carried out than with a detected smaller torque. As initially explained, the rope stiffness against rotation of the respective rope used can be taken into account in this respect.

To avoid a signal oscillation or an uncontrolled rotation to and fro of the torque support 14 between the abutment parts 16, the rotary drive 5 can be held in a starting position by means of a braking device or a retention device and/or return device, out of which starting position the torque support 14 only moves when the toque induced by the rope twist exceeds a certain magnitude or a threshold value. Such a braking device or return device or retention device can be implemented, for example, by a spring device 18 which can be connected in a pivotable manner to the swivel part 4a, on the one hand, and to the torque support 14, on the other hand, cf. FIG. 4. If the rope has a preferred twist direction, a spring or a braking apparatus or retention apparatus active in only one direction can be provided, whereas FIG. 4 shows a return device active at two sides in which the direction of the rope twist is of no importance.

The sensor signals can be transmitted by cable, but preferably also wirelessly, to the named control apparatus 15.

The named control apparatus 15 can in this respect be configured as operating fully automatically such that it actuates the rotary drive 5 independently and automatically in dependence on the signal of the direction of rotation measurement unit 13 and/or of the torque gauge 11. Alternatively, a semi-automatically operating manner of work of the control apparatus can also be provided such that a sensor signal of the direction of rotation sensor 13 and/or of the torque gauge 11 is first indicated to a machine operator who can then set the rotary drive 5 into motion by actuating an input element such as a button and who can initiate the forced rotation of the swivel parts 4a and 4b which can then be monitored and optionally terminated and/or controlled in dependence on the actuation of the input element by the control apparatus 15.

Figure 5:
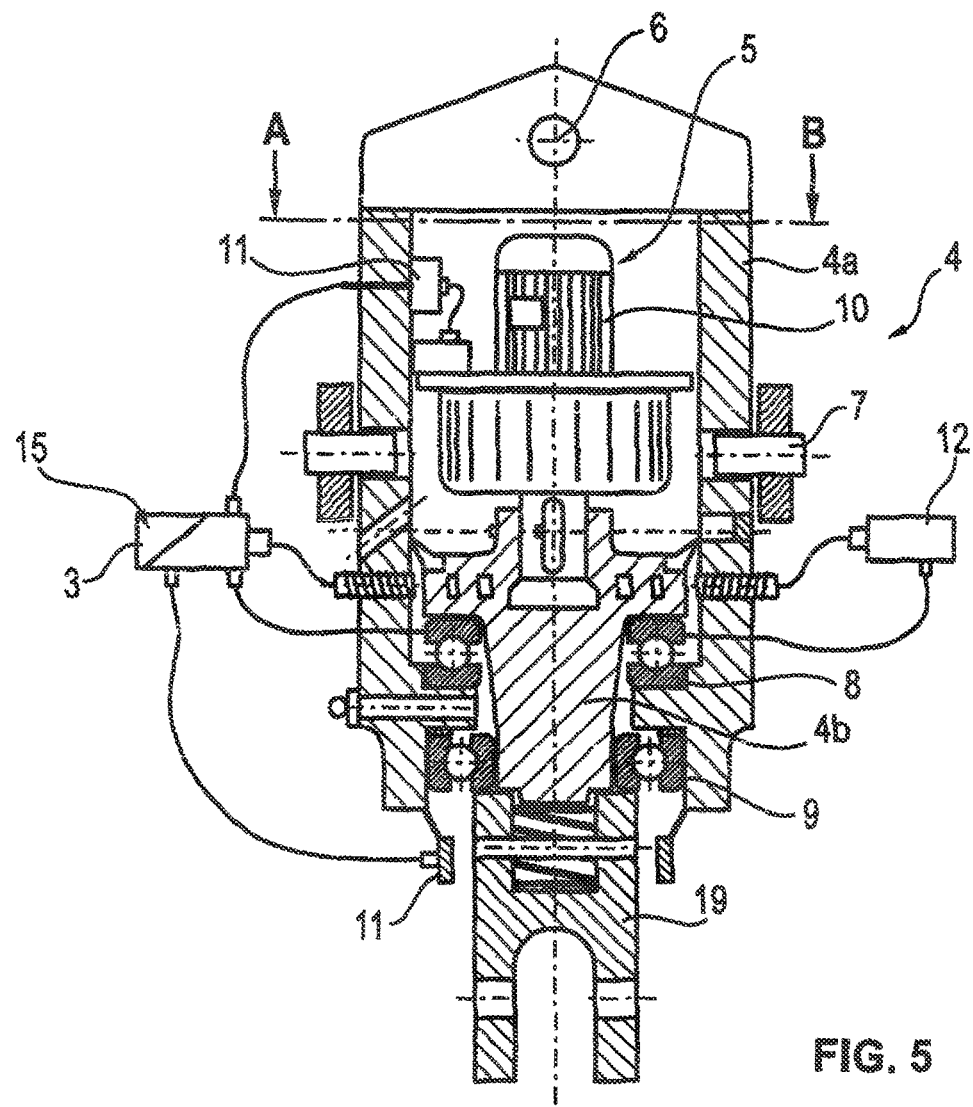
FIG. 5 shows a longitudinal section of the swivel integrated in the rope drive of the crane of FIG. 1 in accordance with a further embodiment of the invention in accordance with which the sensor unit is configured with a plurality of torque sensor variants and is supplemented with an angle of rotation sensor, but otherwise substantially corresponds to the embodiment in accordance with FIG. 3.
Figure 6:
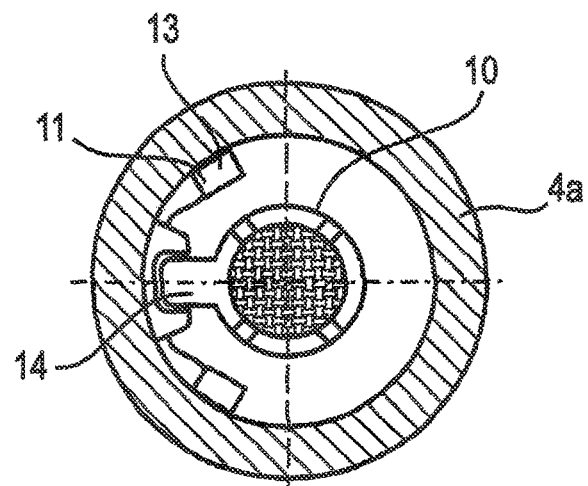
FIG. 6 shows a cross-section through the rotary drive of the swivel of FIG. 5 along the line A-B entered there, wherein the torque support of the rotary drive and the torque gauge associated therewith are shown.

FIGS. 5 and 6 show an embodiment of a swivel 4 which is similar in principle and which substantially corresponds to parts of the embodiment in accordance with FIGS. 3 and 4 so that we would like to refer to this preceding description in this respect.

The swivel in accordance with FIGS. 5 and 6 substantially differs from the embodiment in accordance with FIGS. 3 and 4 by the design of the sensor unit. On the one hand, in addition to the direction of rotation measurement unit 13 and to the torque gauge 11, an adjustment angle gauge 12 is provided which detects the rotation of the two swivel parts 4a and 4b quantitatively with respect to one another. On the other hand, the torque support 14 is substantially clearance-free between two abutment contours 16 or is only captured with a relatively small clearance so that no significant rotation of the rotary drive 5 is possible with respect to the fixed-position swivel part 4a, wherein the design of the torque gauge 11 and of the direction of rotation sensor 13 can differ.

The named adjustment angle gauge 12, torque gauge 11 and direction of rotation measurement unit 13 can generally be configured differently and can, for example, comprise operating parameter measurement units for determining operating parameters of the drive motor of the rotary drive 5. The torque can, for example, be determined from the operating parameters of current and voltage of the drive motor. Alternatively or additionally, the torque gauge 11 can be associated with the previously named torque support 14 of the rotary drive 5 opposite the swivel part 4a to detect the torque and to provide it to the control unit 15. The named direction of rotation sensor 13 can also be associated with the torque support 14, for example can be combined with the named torque gauge 11 to form a detection unit which detects the pressure of the torque support against the abutment contour at the swivel part 4a.

Alternatively or additionally, the torque gauge 11 and/or the direction of rotation measurement unit 13 can also be integrated in a connection part 19 or can be associated with this connection part 19 with which the rope 1 is connected to the rotatable swivel part 4b.

The adjustment angle gauge 12 or a corresponding speed sensor can, for example, be arranged at an interface between the two swivel parts 4a and 4b to directly detect the rotation of the two swivel parts with respect to one another. Alternatively or additionally, an adjustment angle gauge 12 can also be associated with the rotary drive 5 or can be arranged at a gear shaft or at the output shaft of the rotary drive 5.

The rotational stiffness of the rope 1 can in particular be determined and/or monitored with the aid of the named additional rotational angle gauge 12 in that the angle of rotation adopted at a specific torque of the drive motor or conversely the torque required for a predefined twisting angle is detected. The rotational stiffness of the rope determined in such a manner can then, for example, be taken into account in the aforesaid manner to adapt the actuation of the rotary drive 5 for the setting of an untwisted rope configuration to the rotational stiffness of the rope.

The invention claimed is:

1. A swivel for reduction of twist of a rope, the swivel having a first swivel part and a second swivel part which are rotatable with respect to one another in a longitudinal direction of the rope and which transmit tensile forces, wherein the two swivel parts are forcibly rotatable with respect to one another via a rotary drive in communication with one or both of the two swivel parts, wherein the swivel includes at least one direction of rotation measurement unit for determining a direction of twist of the rope with respect to the swivel, and wherein the rotary drive is controllable by a control apparatus in dependence on the determined direction of twist to rotate the second swivel part, which is rotationally fixedly connected to the rope, in the direction of the determined direction of twist of the rope, wherein the rotary drive further comprises a drive housing, the drive housing supported with at least limited rotatability with respect to the first swivel part, the first swivel part arranged in a fixed position, wherein a braking apparatus is provided between the drive housing and the first swivel part for braking the rotation of the drive housing with respect to the first swivel part and/or an elastic restoring apparatus is provided for applying a restoring force which attempts to return the drive housing into a non-rotated starting position with respect to the first swivel part, and wherein the braking apparatus and/or the elastic restoring apparatus comprises a spring device connected in a pivotable manner to the first swivel part on one end of the spring device and to a torque support of the drive housing on another end of the spring device.

2. The swivel in accordance with claim 1, wherein a torque gauge is provided for determining a torque induced by the twist of the rope at the swivel and the rotary drive is controllable by the control apparatus in dependence on the determined torque, wherein the determined torque is brought toward zero by a forced rotation of the first and second swivel parts.

3. The swivel in accordance with claim 2, wherein the control apparatus comprises a twist compensator for an automatic compensation of a rope twist, wherein the twist compensator comprises a control module for an automatic control of the rotary drive in dependence on a direction of rotation of the twist of the rope acting on the swivel determined by the direction of rotation measurement unit and/or in dependence on the torque at the swivel determined by the torque gauge, wherein the control module is configured such that the rotary drive is actuated such that the torque detected by the torque gauge is brought toward zero by the forced rotation of the swivel and/or a direction of rotation signal which can be output by the direction of rotation measurement unit is absent.

4. The swivel in accordance with claim 2, wherein the direction of rotation measurement unit and/or the torque gauge is/are integrated in the swivel and/or in the rotary drive.

5. The swivel in accordance with claim 4, wherein the torque gauge is integrated in an inner space surrounded by the first swivel part.

6. The swivel in accordance with claim 2, wherein the control apparatus is configured such that, as the torque becomes increasingly larger, an increasingly larger forced rotation of the first and second swivel parts relative to one another is performed, wherein a rotational stiffness of the rope of the respective installed rope is taken into account on a determination of a magnitude of the forced rotation to be carried out.

7. The swivel in accordance with claim 2, wherein the rotary drive is rotationally fixedly connected at an output element to the second swivel part, and supported against rotation by at least one torque support and at least one abutment contour at the first swivel part, wherein the direction of the rotation measurement unit and/or the torque gauge is/are associated with the at least one torque support and/or with the at least one abutment contour.

8. The swivel in accordance with claim 2, wherein the direction of rotation measurement unit and/or the torque gauge is/are integrated in a drive train of the rotary drive or is/are arranged in association with a connection piece with which the rope is rotationally fixedly connectable to the second swivel part.

9. The swivel in accordance with claim 2, wherein the rotary drive is supported against rotation in opposite directions of rotation by means of the at least one torque support and at least two abutment contours and the direction of rotation measurement unit and/or the torque gauge has/have a sensor element for each of the abutment contours.

10. The swivel in accordance with claim 1, wherein an angle of rotation measurement unit is provided for determining an angle of rotation between the first and second swivel parts.

11. The swivel in accordance with claim 1, wherein the swivel is included in a crane, and wherein a hoist rope of the crane is attached with the swivel to a boom of the crane, wherein the first swivel part is rotationally fixedly connected to the boom.

12. The swivel in accordance with claim 11, wherein the crane is a tower crane, a mobile crane, a harbor mobile crane, a ship's crane, and/or a vehicle boom crane.

13. The swivel in accordance with claim 1, wherein the rotary drive is integrated in the swivel.

14. The swivel in accordance with claim 13, wherein the rotary drive is arranged in an inner space surrounded by the first swivel part.

* * * * *